US010118372B2

(12) United States Patent
Dalal et al.

(10) Patent No.: US 10,118,372 B2
(45) Date of Patent: Nov. 6, 2018

(54) LAMINATE COMPRISING POLYOLEFIN ELASTIC FILM LAYER

(71) Applicant: The Procter & Gamble Company, Cincinnati, OH (US)

(72) Inventors: Urmish Popatlal Dalal, Milford, OH (US); Ray Dennis Dria, Mason, OH (US); David Harry Melik, Cincinnati, OH (US); Keith Richard Coburn, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 466 days.

(21) Appl. No.: 14/723,585

(22) Filed: May 28, 2015

(65) Prior Publication Data
US 2015/0352819 A1 Dec. 10, 2015

Related U.S. Application Data

(63) Continuation-in-part of application No. 14/708,344, filed on May 11, 2015, now Pat. No. 9,834,667.
(Continued)

(51) Int. Cl.
*B32B 27/32* (2006.01)
*B32B 5/02* (2006.01)
*B32B 27/12* (2006.01)

(52) U.S. Cl.
CPC ............... *B32B 27/32* (2013.01); *B32B 5/022* (2013.01); *B32B 27/12* (2013.01);
(Continued)

(58) Field of Classification Search
CPC ......... B32B 27/32; B32B 5/022; B32B 27/12; B32B 2307/51; B32B 2262/12;
(Continued)

(56) References Cited

U.S. PATENT DOCUMENTS 5,143,679 A 9/1992 Weber et al.
5,151,092 A 9/1992 Buell et al.
(Continued)

FOREIGN PATENT DOCUMENTS

EP 1256594 A1 11/2002
WO WO 2005/019515 3/2005
WO WO 2007/053603 5/2007

OTHER PUBLICATIONS

International Search Report, PCT/US2015/0328547, dated Dec. 4, 2015, 10 pages.
(Continued)

*Primary Examiner* — Jeremy R Pierce
(74) *Attorney, Agent, or Firm* — James T. Fondriest; Kathleen Y. Carter

(57) ABSTRACT

Disclosed is a laminate comprising at least one polyolefin elastic film layer and at least one substrate layer;
the polyolefin elastic film having the following properties:
(1) an average integrated enthalpy sum of no greater than 17 J/g, preferably between about 5-17 J/g, according to the Thermal Analysis Method defined herein;
(2) an average integrated enthalpy ratio of from 0.6 to 300, preferably 0.8 to 300, still preferably 1.0 to 300, according to the Thermal Analysis Method defined herein; and
(3) an unload stress at 75% strain of above 0.8 MPa according to the Hysteresis Test defined herein; and
wherein the laminate has a normalized load force/normalized unload force ratio at 75% strain of 1 to 2.6 according to the Hysteresis Test defined herein.

12 Claims, 7 Drawing Sheets

Related U.S. Application Data

(60) Provisional application No. 62/008,464, filed on Jun. 5, 2014.

(52) U.S. Cl.
CPC ....... *B32B 2262/12* (2013.01); *B32B 2305/20* (2013.01); *B32B 2305/28* (2013.01); *B32B 2307/51* (2013.01); *B32B 2307/718* (2013.01); *B32B 2307/726* (2013.01); *B32B 2437/00* (2013.01); *B32B 2555/02* (2013.01); *Y10T 428/273* (2015.01); *Y10T 428/31938* (2015.04); *Y10T 442/601* (2015.04); *Y10T 442/637* (2015.04); *Y10T 442/678* (2015.04)

(58) Field of Classification Search
CPC .......... B32B 2437/00; B32B 2307/718; B32B 2305/20; B32B 2555/02; B32B 2307/726; B32B 2305/28; C08J 5/18; C08J 2323/08; C08J 2323/14; C08J 2423/08; C08J 2423/14

See application file for complete search history.

(56) References Cited

U.S. PATENT DOCUMENTS

| | | |
|---|---|---|
| 5,156,793 A | 10/1992 | Buell et al. |
| 5,167,897 A | 12/1992 | Weber et al. |
| 6,120,487 A | 9/2000 | Ashton |
| 6,169,151 B1 | 1/2001 | Waymouth et al. |
| 6,518,378 B2 | 2/2003 | Waymouth et al. |
| 6,555,643 B1 | 4/2003 | Rieger |
| 6,559,262 B1 | 5/2003 | Waymouth et al. |
| 6,843,134 B2 | 1/2005 | Anderson et al. |
| 7,062,983 B2 | 6/2006 | Anderson et al. |
| 2003/0022582 A1 | 1/2003 | Cree et al. |
| 2005/0106980 A1 | 5/2005 | Abed et al. |
| 2005/0171285 A1 | 8/2005 | Cozewith et al. |
| 2009/0264844 A1* | 10/2009 | Autran ............ A61F 13/15593 604/365 |
| 2011/0152811 A1 | 6/2011 | Bing-Wo et al. |

OTHER PUBLICATIONS

International Search Report, PCT/US2015/030067, dated Jul. 3, 2015, 9 pages.

Jiang, Genjie, et al., "Improved Processing Behaviors and Mechanical Properties of Polyolefin Elastomer Blends Prepared by Ultrasound-Assisted Extrusion", Journal of Applied Polymer Science, vol. 112, 2136-2142 (2009), XP-002741087.

* cited by examiner

LAMINATE COMPRISING POLYOLEFIN ELASTIC FILM LAYER

FIELD OF THE INVENTION

The present invention relates to a laminate comprising a polyolefin elastic film layer which exhibits improved hysteresis properties.

BACKGROUND OF THE INVENTION

Elastic materials, especially elastic films and laminates, are commonly used for a wide variety of applications. For example, absorbent articles typically include one or more components that rely on elastic materials to control the movement of liquids and to provide a comfortable, conforming fit when the article is worn by a wearer. A typical way of introducing elastic material in an absorbent article is either though waistbands, leg elastics, side panels, elastic belts, stretch outer cover or stretch ears. Hysteresis behavior, i.e. the load to unload performance in tensile testing, is a good measure of how well the product performs and it is often associated with the elastic materials used in the article.

Conventional elastic materials made out of styrenic block copolymers and/or polyurethanes may provide favorable hysteresis performance, but may also undesirably impact the cost and/or complexity of manufacturing the product. With recent metallocene chemistry development, a new class of elastic polyolefins including, but not limited to random copolymerized propylene with ethylene, have become available for product application, such as described in U.S. Patent Application publication US 2005/0171285A and PCT Patent Publication WO 2007/053603. While these materials deliver certain hysteresis performance, there is yet room for improvement, without significant cost added for making the material.

SUMMARY OF THE INVENTION

Figure 1:
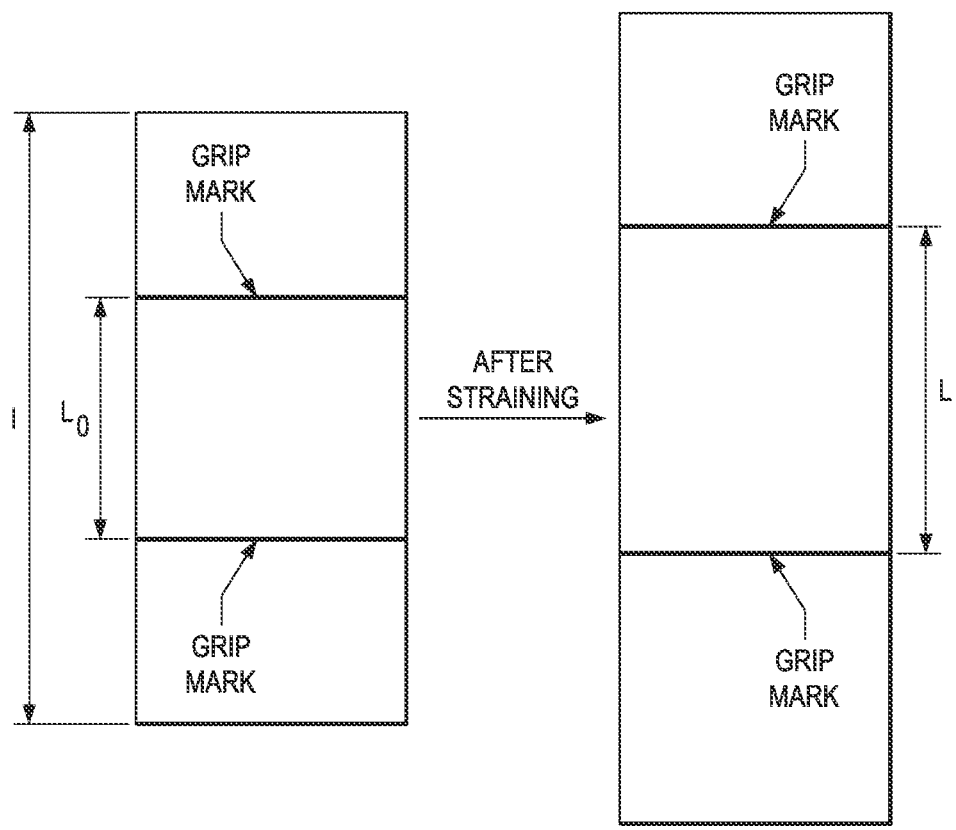
FIG. 1 is a systematic representation of the measurement methods for the Tensile Test and the Hysteresis Test defined herein.

In order to provide a solution to the opportunity for improvement set forth above, a laminate comprising a polyolefin elastic film layer is disclosed. The laminate exhibits suitable hysteresis properties as well as acceptable robustness to tensile stress without significant cost added for making the material.

DETAILED DESCRIPTION OF THE INVENTION

Definitions

"Absorbent article" means a device that absorbs and contains body exudates and, more specifically, devices that are placed against or in proximity to the body of the wearer to absorb and contain the various exudates discharged from the body. Exemplary absorbent articles include diapers, training pants, pull-on pant-type diapers (i.e., a diaper having a pre-formed waist opening and leg openings such as illustrated in U.S. Pat. No. 6,120,487), refastenable diapers or pant-type diapers, incontinence briefs and undergarments, diaper holders and liners, feminine hygiene garments such as panty liners, absorbent inserts, and the like.

"Activation" is the mechanical deformation of a extensible material that results in permanent elongation of the material in the direction of activation. Activation of a laminate that includes an elastic material joined to a extensible material typically results in permanent deformation of the extensible material, while the elastic material returns substantially to its original dimension. "Activate," and variations thereof, means subjecting a material to an activation process. Activation is often referred to as sequentially stretching or incremental stretching or ring rolling. One method for activating or sequentially stretching a "zero strain" stretch laminate web to impart elasticity thereto is disclosed in U.S. Pat. No. 5,143,679 issued to Weber et al. on Sep. 1, 1992 and hereby incorporated herein by reference. U.S. Pat. No. 5,143,679 teaches the use of a stretch laminate material formed of at least two plies, one of which is stretchable and elastomeric, while the second ply is elongatable, but not necessarily elastomeric. The plies are either intermittently or substantially continuously secured to one another along at least a portion of their coextensive surfaces while in a substantially untensioned ("zero-strain") condition. U.S. Pat. No. 5,143,679 further discloses an improved method and apparatus for sequentially stretching the "zero-strain" stretch laminate portions of the web during the incremental stretching process to impart elasticity in the direction of stretching without rupturing the laminate web in the process. Other activation methods are taught in U.S. Pat. No. 5,156,793 issued to Buell et al. on Oct. 20, 1992 and U.S. Pat. No. 5,167,897 issued to Weber et al. on Dec. 1, 1992, both of which are hereby incorporated by reference herein. Laminates may also be activated on a High Speed Research Press (HSRP) as described in U.S. Pat. Nos. 7,062,983 and 6,843,134 issued to Anderson et al. Activation in the described simulated ring rolling process refers to using aluminum plates with inter-meshing teeth, as opposed to roll system used in U.S. Pat. No. 5,156,793 or 5,167,897, to incrementally stretch portions of the laminate.

"Aperture" means an opening in a film purposefully added during film making or laminate making, which is intended to impart a desired characteristic such as breathability. "Basis weight" is the property of a sheet or web of material calculated as the mass of the material divided by its surface area. The units for basis weight herein are grams per square meter ($g/m^2$).

"Breathable" means a film or laminate that has an Air Permeability Value of between 5.0 and 50 $m^3/m^2/min$ according to the Air Permeability Test described below.

"Copolymer" means a polymer derived from two or more monomer species wherein the polymer chains each comprise repeat units from more than one monomer species.

"Crystalline melting temperatures" are determined by Differential Scanning Calorimetry, for example, as described below in the Thermal Analysis method. Materials may have one or more melting endotherm peaks.

"Disposed" means an element is positioned in a particular place with regard to another element.

"Extensible" means the ability to stretch or elongate, without rupture or breakage, to at least 130% strain, for example, as described below in the Hysteresis Test.

"Elastic," "elastomeric," and "elastically extensible" mean the ability of a material to stretch by at least 130% strain without rupture or breakage at a given load, and upon release of the load the elastic material or component exhibits at least 70% recovery (i.e., has less than 30% set). For example, an elastic material that has an initial length of 25.4 mm can stretch to at least 58.4 mm (130% stretch) and, upon removal of the force, retract to a length of 30.5 mm (i.e., have a set of 5.1 mm or 20%). Stretch, sometimes referred to as strain, percent strain, engineering strain, draw ratio, or elongation, along with recovery and set may each be determined according to the Hysteresis Test described below.

"Film" means a sheet-like material wherein the length and width of the material far exceed the thickness of the material (e.g., 10 times, 50 times, or even 1000 times or more). Films are typically liquid impermeable but may be configured to be breathable.

"Joined" means configurations whereby an element is directly secured to another element by affixing the element directly to the other element, and configurations whereby an element is indirectly secured to another element by affixing the element to intermediate member(s) that in turn are affixed to the other element.

"Laminate" means two or more materials that are bonded to one another by any suitable method known in the art (e.g., adhesive bonding, thermal bonding, ultrasonic bonding, or high pressure bonding using non-heated or heated patterned roll).

"Longitudinal" means a direction running substantially perpendicular from a waist end edge to an opposing waist end edge of an absorbent article when the article is in a flat out, uncontracted state, or from a waist end edge to the bottom of the crotch in a bifolded article. Directions within 45 degrees of the longitudinal direction are considered to be "longitudinal." "Lateral" refers to a direction running from a side edge to an opposing side edge of an article and generally perpendicular to the longitudinal direction. Directions within 45 degrees of the lateral direction are considered lateral.

"Machine direction" or "MD" is the direction parallel to the direction of travel of the film in which it is extruded or the web in a manufacturing process. Directions within 45 degrees of the MD are considered to be machine directional. The "cross machine direction" or "CD" is the direction substantially perpendicular to the MD and in the plane generally defined by the film or web. Directions within 45 degrees of the CD are considered to be cross directional.

"Nonwoven" means a porous, fibrous material made from continuous (long) filaments (fibers) and/or discontinuous (short) filaments (fibers) by processes such as, for example, spunbonding, meltblowing, airlaying, carding, coforming, hydroentangling, and the like. Nonwovens do not have a woven or knitted filament pattern. Nonwovens may be liquid permeable or impermeable.

"Relaxed" means the state of an element, material or component at rest with substantially no external force acting on the element, other than gravity.

"Web" means a material capable of being wound into a roll. Webs may be films, nonwovens, laminates, apertured films and/or laminates, and the like. The face of a web refers to one of its two dimensional surfaces, as opposed to its edge.

"X-Y plane" means the plane defined by the MD and CD of a moving web or the length and width of a piece of material.

Polyolefin Elastic Film Layer

The laminate of the present invention comprises at least one polyolefin elastic film layer. The composition for the polyolefin elastic film layer of the present invention may be made by modifying or blending one or more polyolefin elastomer materials that have elastic properties, according to the definition herein. The polyolefin elastomer materials useful herein include, but are not limited to, any polymers or copolymers of polyolefins such as polyethylene and polypropylene. Particularly suitable examples of elastomer materials include elastomeric polypropylenes. In these materials, propylene represents the majority component of the polymeric backbone, and as a result, any residual crystallinity possesses the characteristics of polypropylene crystals. Residual crystalline entities embedded in the propylene-based elastomeric molecular network may function as physical crosslinks, providing polymeric chain anchoring capabilities that improve the mechanical properties of the elastic network, such as high recovery, low set and low force relaxation. Suitable examples of elastomeric polypropylenes include an elastic random poly(propylene/olefin) copolymer, an isotactic polypropylene containing stereo-irregularity, an isotactic/atactic polypropylene block copolymer, an isotactic polypropylene/random poly(propylene/olefin) copolymer block copolymer, a stereoblock elastomeric polypropylene, a syndiotactic polypropylene block poly(ethylene-co-propylene) block syndiotactic polypropylene triblock copolymer, an isotactic polypropylene block regioirregular polypropylene block isotactic polypropylene triblock copolymer, a polyethylene random (ethylene/olefin) copolymer block copolymer, a reactor blend polypropylene, a very low density polypropylene (or, equivalently, ultra low density polypropylene), a metallocene polypropylene, and blends or combinations thereof. Suitable polypropylene polymers including crystalline isotactic blocks and amorphous atactic blocks are described, for example, in U.S. Pat. Nos. 6,559,262, 6,518,378, and 6,169,151. Suitable isotactic polypropylene with stereo-irregularity along the polymer chain are described in U.S. Pat. No. 6,555,643 and EP 1 256 594 A1. Suitable examples include elastomeric random copolymers including propylene with a low level comonomer (e.g., ethylene or a higher alpha-olefin) incorporated into the backbone.

In one embodiment, the polyolefin elastic film composition of the present invention may be made by blending at least two (2) polyolefin elastomer materials. The polyolefin elastomer materials useful for preparing the present polyolefin elastic film composition in such manner include metallocene polypropylene, and those having a crystalline melting point of at least 75° C., or at least 80° C., as defined by the Thermal Analysis Method defined herein. Such polyolefin elastomer materials may be selected from commercially available material such as, but not limited to: Vistamaxx 6102 (available from ExxonMobil, Houston, Tex.), random propylene-ethylene copolymers; NOTIO PN-0040 and PN-2070 (available from Mitsui Chemicals, Tokyo Japan), elastic polyolefin resins; L-MODU X901S (available from Mitsui Chemicals, Tokyo Japan): a stereo copolymer of polypropylene; Versify 2400A, 2400B, 3401A and 3401B (available from Dow Chemical, Midland, Mich.), random copolymers of propylene with ethylene.

The polyolefin elastic film composition of the present invention may include one or more additives commonly used in the art to tailor the composition for a particular use. For example, stabilizers, antioxidants, and bacteriostats may be employed to prevent thermal, oxidative, and bio-chemical degradation of the polyolefin elastic film composition. Generally, the additive or additives may account for 0.01% to 20%; 0.01% to 10%; or even 0.01% to 2% of the total weight of the polyolefin elastic film composition.

Suitable examples of stabilizers and antioxidants include high molecular weight hindered phenols (i.e., phenolic compounds with sterically bulky radicals in proximity to the hydroxyl group), multifunctional phenols (i.e., phenolic compounds with sulfur and phosphorous containing groups), phosphates such as tris-(p-nonylphenyl)-phosphite, hindered amines, and combinations thereof. Representative hindered phenols include t-butylhydroxyquinone; 1,3,5-trimethyl-2, 4,6-tris(3-5-di-tert-butyl-4-hydroxybenzyl)benzene; pentaerythritol tetrakis-3(3,5-di-tert-butyl-4-hydroxyphenyl) propionate; n-octadecyl-3(3,5-ditert-butyl-4-hydroxyphenyl) propionate; 4,4'-methylenebis(4-methyl-6-tert butylphenol); 4,4'-thiobis(6-tert-butyl-o-cresol); 2,6-di-tert-butylphenol; 6-(4-hydroxyphenoxy)-2,4-bis(n-ocytlthio)-1,3, 5-triazine; 2,4,6-tris(4-hydroxy-3,5-di-tert-butyl-phenoxy)-1,3,5-triazine; di-n-octadecyl-3,5-di-tert-butyl-4-ydroxybenzylphosphonate; 2-(n-octylthio)ethyl-3,5-di-tert-butyl-4-hydroxybenzoate; and sorbitol hexa-(3,3,5-di-tert-butyl-4-hydroxy-phenyl) propionate. Proprietary commercial stabilizers and/or antioxidants are available under a number of trade names including a variety of Wingstay®, Tinuvin® and Irganox® products.

Examples of suitable bacteriostats include benzoates, phenols, aldehydes, halogen containing compounds, nitrogen compounds, and metal-containing compounds such as mercurials, zinc compounds and tin compounds. A representative bacteriostat is 2,4,4'-trichloro-2'-hydroxy-diphenyl-ether which is available under the trade designation IRGASAN PA from Ciba Specialty Chemical Corporation, Tarrytown, N.Y.

Various viscosity modifiers, processing aids, slip agents or anti-block agents can be employed as additives to provide improved handling characteristics or surface characteristics. Processing aids include processing oils, which are well known in the art and include synthetic and natural oils, naphthenic oils, paraffinic oils, olefin oligomers and low molecular weight polymers, vegetable oils, animal oils, and derivatives of such including hydrogenated versions. Processing oils also may incorporate combinations of such oils. A particularly suitable processing oil is mineral oil.

A variety of fillers can also be used as additives to the polyolefin elastic film composition. Examples of suitable fillers include talc, calcium carbonate, carbon black, clay, and mica. The filler may be selected in combination with antioxidants to minimize impact on stability.

A wide range of pigments can also be employed to impart desirable color to the polyolefin elastic film composition. Organic and inorganic pigments such as azo, quinacridone, cadmium, and chrome containing pigments may be blended with the polyolefin elastic film composition.

Nucleating agents such as sorbitol based compounds, sodium salts of organic phosphates, sodium benzoate may be used in combination with the polyolefin elastic film composition. They help improve optical properties and physical properties of the polyolefin elastic film composition.

Compatiblizers can also be used in combination with the polyolefin elastic film composition. They help improve interfacial adhesion between components. This often results in better mechanical and/or optical properties.

The polyolefin elastic film composition of the present invention may be used in extrusion processes to produce products in film forms. The polyolefin elastic film composition can be cast or blown to make a sheet. The polyolefin elastic film composition may be used in combination with other resins, either blended or as separate layers to form sheets.

The polyolefin elastic film composition of the present invention may be formed by any suitable method in the art, for example, by extruding molten thermoplastic and/or elastomeric polymers through a slit die and subsequently cooling the extruded sheet. Other non-limiting examples for making film forms include casting, blowing, solution casting, calendering, and formation from aqueous or, non-aqueous cast dispersions. One suitable method for obtaining the polyolefin elastic film composition of the present invention in the film form is by allowing polyolefin elastomers or other materials obtained in pellet form to be mixed and extruded by a high torque co-rotating twin-screw extruder, namely extrusion blending. The polyolefin elastic film composition of the present invention may be made into a film having a basis weight of from about 5 to about 150 g/m$^2$, preferably from about 10 to about 100 g/m$^2$.

The polyolefin elastic film composition of the present invention preferably has a crystalline melting point of at least 75° C., or at least 80° C., as defined by the Thermal Analysis Method defined herein. Without being bound by theory, it is believed that the polyolefin elastic film composition of the present invention having such melting point may provide better hysteresis, and further provide better stability at relatively high temperature storage conditions.

According to the Hysteresis Test defined herein, the polyolefin elastic film layer of the present invention exhibits an unload stress at 75% strain of greater than 0.80 MPa. According to the Hysteresis Test, the polyolefin elastic film layer as well as the laminate comprising such layer of the present invention exhibits a load stress/unload stress ratio at 75% strain of between 1.0 and 2.6. The elastic film layer as well as the laminate comprising such layer of the present invention show desired hysteresis properties at a low basis weight after straining, which is a treatment typically undergone for an elastic element used on a product. Without being bound by theory, it is believed that such properties provide good fit required of, for example, absorbent articles.

According to the Thermal Analysis Method, the polyolefin elastic film composition of the present invention exhibits characteristic crystalline melting properties when the regions are divided into 3 temperature zones: Zone I between 30-80° C., Zone II between 80-120° C., and Zone III between 120-170° C. Without being bound by theory, it is believed that Zones I and III provide a correlation between crystallinity and hysteresis performance. The polyolefin elastic film composition of the present invention exhibits an average integrated enthalpy sum of Zones I and III of no greater than 17 J/g, preferably between about 5-17 J/g. Further, the polyolefin elastic film composition of the present invention has an average integrated enthalpy ratio of Zone I to Zone III of from 0.6 to 300, preferably 0.8 to 300 or still preferably 1.0 to 300.

The polyolefin elastic film of the present invention shows desired performance as a mono-layer film, and may be co-extruded with other materials to form a multi-layer film. One or more layers of the multi-layer film can be a skin layer, which helps prevent blocking. The skin layer is preferably made of extensible materials. A layer in the multi-layer film can be provided as a tie layer, which provides good boundary strength with two non-bondable adjacent layers. The elastic film of the present invention may further be apertured to impart breathability.

The elastic film of the present invention having a basis weight of from about 5 to about 150 g/m² may be laminated with other plastic films, nonwovens, and/or substrates, as described in detail below.

Substrate Layer

The laminate of the present invention comprises at least one substrate layer in addition to the aforementioned polyolefin elastic film layer. The substrate layer may be an extensible material including but not limited to another polymer film, fabric, nonwoven fabric, woven fabric, knitted fabric, scrim, or netting. The substrate layer may be a nonwoven fabric having a basis weight of from any of about 3, about 4, about 5, about 7, about 9, about 10, about 15, about 20, about 25, about 30, or about 40 g/m², to any of about 50, about 75, about 100, about 150, or about 200 g/m², or from 3 to 200 g/m².

The polyolefin elastic film layer can be bonded to substrate layers on one or both sides. When two or more substrate layers are used to make the laminate, the substrate layers can be the same or different material. The composition of the substrate layers can be the same or different, even when the same extensible material is used (e.g., two nonwoven layers where one nonwoven layer is made from polyolefin and the other nonwoven layer is made from polyester). If two substrate layers are used, one layer can have a basis weight that is the same or different from the other. In some embodiments, the substrate layer is a nonwoven fabric. For example, the substrate layer can be spunbond nonwoven webs, carded nonwoven webs, meltblown nonwoven webs, spunlaced nonwoven webs, spunbond meltblown spunbond nonwoven webs, spunbond meltblown meltblown spunbond nonwoven webs, unbonded nonwoven webs, electrospun nonwoven webs, flashspun nonwoven webs (e.g., TYVEK™ by DuPont), or combinations thereof. These fabrics can comprise fibers of polyolefins such as polypropylene or polyethylene, polyesters, polyamides, polyurethanes, elastomers, rayon, cellulose, copolymers thereof, or blends thereof or mixtures thereof. The nonwoven fabrics can also comprise fibers that are homogenous structures or comprise bicomponent structures such as sheath/core, side-by-side, islands-in-the-sea, and other bicomponent configurations. For a detailed description of some nonwovens, see "Nonwoven Fabric Primer and Reference Sampler" by E. A. Vaughn, Association of the Nonwoven Fabrics Indus-3d Edition (1992).

The nonwoven fabrics can include fibers or can be made from fibers that have a cross section perpendicular to the fiber longitudinal axis that is substantially non-circular. Substantially non-circular means that the ratio of the longest axis of the cross section to the shortest axis of the cross section is at least about 1.1. The ratio of the longest axis of the cross section to the shortest axis of the cross section can be about 1.1, about 1.2, about 1.5, about 2.0, about 3.0, about 6.0, about 10.0, or about 15.0. In some embodiments, this ratio can be at least about 1.2, at least about 1.5, or at least about 2.0. These ratios can be, for example, no more than about 3.0, no more than about 6.0, no more than about 10.0, or no more than about 15.0. The shape of the cross section perpendicular to the fiber longitudinal axis of the substantially non-circular fibers can be rectangular (e.g., with rounded corners) which are also referred to as "flat" fibers, trilobal, or oblong (e.g., oval) in the cross section. These substantially non-circular fibers can provide more surface area to bond to the elastomeric film than nonwoven fabrics with fibers that are circular in cross section. Such an increase in surface area can increase the bond strength between the elastomeric film and fibers.

Laminate

The laminate of the present invention may be made of at least one layer of the polyolefin elastic film layer and at least one layer of the substrate layer, wherein the substrate layer is assembled to face the wearer, when assembled into, for example, an absorbent article. The polyolefin elastic film layer may be sandwiched by 2 layers of substrate layer to form a trilaminate.

One method of making the laminate is the "Zero Strain" approach, wherein the polyolefin elastic film layer and substrate layers are combined in substantially untensioned condition, where none of the materials is strained beyond what is typically required for web handling. After bonding the substrate layer and polyolefin elastic film layer in "Zero Strain" condition, the laminate may tend to be less elastomeric due to the relative inelasticity of the substrate layer. To render the substrate layer more elastic, and to restore elasticity to the laminate, the laminate of the present invention may be processed by methods and apparatus used for elasticizing "zero strain" laminates by incremental stretching, as disclosed in U.S. Pat. No. 5,151,092 to Buell et al., as well as the aforementioned patents; U.S. Pat. No. 5,167,897 to Weber et al., U.S. Pat. No. 5,156,793 to Buell et al., U.S. Pat. No. 5,143,679 to Weber et al., U.S. Pat. Nos. 7,062,983 and 6,843,134 to Anderson et al. The resulting elasticized "zero-strain" laminate then has a soft, cloth-like feel for extended use and comfortable fit in an absorbent garment.

The laminates may be prepared by various other methods known in the art. In one embodiment, the polyolefin elastic film layer may be stretched to a desired strain level and bonded to the substrate layer that is not strained. One layer or multi-layer of substrate layers may be bonded to the polyolefin elastic film layer to make stretch laminates. Laminates made using such method can stretch in MD or CD after bonding, depending on the film stretch direction. Another method to make the laminate involves necking or straining of the substrate layer in MD, followed by combining with the polyolefin elastic film layer. Laminate made as such show CD stretch. Alternative methods of making the laminate involves combining polyolefin elastic film layer with nonwoven substrate layers that can stretch with little force. Hyrdoentangled or spunjet nonwovens are known to stretch in CD without much resistance and may suitably be combined with the polyolefin elastic film layer to make stretch laminates that are elastic in CD.

The above mentioned laminates, including "Zero Strain" laminates, may be bonded using various methods known to one skilled in the art, and not limiting to thermal, ultrasonic, or adhesive bonding. These laminates may also be activated to release stretch. Activation herein include sequentially stretching or incremental stretching or ring rolling. One method for activating or sequentially stretching a "zero strain" stretch laminate web to impart elasticity thereto is disclosed in U.S. Pat. No. 5,143,679 issued to Weber et al. on Sep. 1, 1992 and hereby incorporated herein by reference. U.S. Pat. No. 5,143,679 teaches the use of a stretch laminate material formed of at least two plies, one of which is stretchable and elastomeric, while the second ply is elongatable, but not necessarily elastomeric. The plies are either intermittently or substantially continuously secured to one another along at least a portion of their coextensive surfaces while in a substantially untensioned ("zero-strain") condition. U.S. Pat. No. 5,143,679 further discloses an improved method and apparatus for sequentially stretching the "zero-strain" stretch laminate portions of the web during the incremental stretching process to impart elasticity in the direction of stretching without rupturing the laminate web in the process. Other activation methods are taught in U.S. Pat. No. 5,156,793 issued to Buell et al. on Oct. 20, 1992 and U.S. Pat. No. 5,167,897 issued to Weber et al. on Dec. 1, 1992, both of which are hereby incorporated by reference herein. Laminates may also be activated on a High Speed Research Press (HSRP) as described in U.S. Pat. Nos. 7,062,983 and 6,843,134 issued to Anderson et al. Activation in the described simulated ring rolling process refers to using aluminum plates with inter-meshing teeth, as opposed to roll system used in U.S. Pat. Nos. 5,156,793 or 5,167,897, to incrementally stretch portions of the laminate.

The activated laminates are allowed to age for a minimum of 7 days at 23±2° C. before testing the physical properties.

Figure 5:
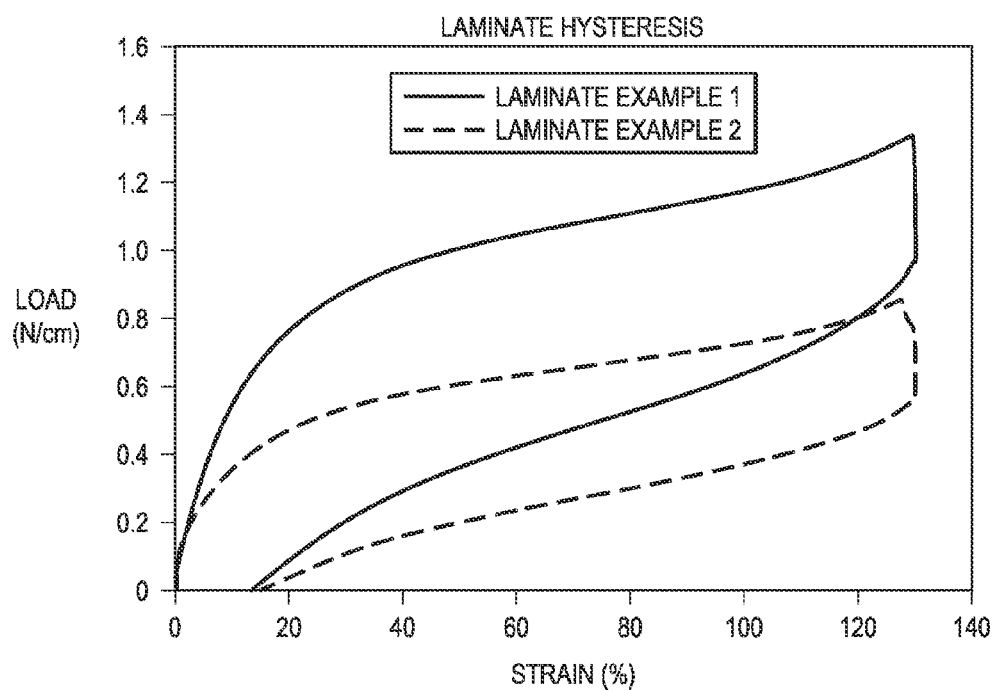
FIG. 5 shows the Hysteresis Test charts of the Laminate Example 1 and Laminate Example 2.

The laminate of the present invention preferably has a normalized unload force at 75% strain of above 0.25N/cm according to the Hysteresis Test defined herein. Without being bound by theory, it is believed that such properties provide good fit required of, for example, absorbent articles. An exemplary hysteresis test chart of the laminate of the present invention is provided in FIG. 5.

The laminate of the present invention preferably exhibits two peaks according to the Tensile Test defined herein. By peaks, what is meant are both a higher force followed by a drop of at least 30%, as well as peak at break. The laminate of the present invention preferably has a normalized force at break of at least 3.4N/cm and/or a % strain at break of at least 500%, thereby providing appropriate strength against activation and other treatments or processes that are typically undergone for an elastic element. The laminate of the present invention may exhibit another peak, rather than the peak at break, at lower than 300% strain. Without being bound by theory, it is believed that such properties define the appropriate application range in use and provide good fit required of, for example, absorbent articles. An exemplary tensile test chart of the laminate of the present invention is provided in FIG. 6.

The laminates of the present invention are useful as elastic elements for absorbent articles such as diapers, feminine pads, bibs, linens, pet sheets, wound dressings, hospital gowns, and the like. Elements useful for making with the laminates include, but are not limited to, waistbands, leg elastic, side panels, elastic belts, stretch outer cover or stretch ears.

Test Methods
1. Basis Weight, Tensile Test, and Hysteresis Test
1-1. Sample Preparation Laminate sample: If necessary, the product part comprising the elastomer composition (e.g. stretch ear) is cut from the product. The direction in which the elastic laminate will stretch in its intended use is considered the primary stretch direction of the material. A set of rectilinear specimens at least 30 mm long in the primary stretch direction, and 25.4 mm wide in the perpendicular direction is cut from the center portion of the product part. Articles having areas of laminate smaller than 30×25.4 mm are considered to be outside the scope of this method. Five specimens are cut from the same portion of identical products for each set. If the difference in the elastic laminate specimen basis weight is more than 10% between highest and lowest basis weight samples for any set, then specimens are re-collected for the set from a different part of the fresh products.

Polyolefin elastic film layer sample: If necessary, the polyolefin elastic film composition is separated from the other components such as laminated nonwoven layers by techniques such as applying "Quik-Freeze®" type cold spray, or other suitable methods that do not permanently alter the properties of the polyolefin elastic film composition. The direction in which the elastic film will stretch in its intended use is considered the primary stretch direction of the material. Care should be taken to prevent stretching of the polyolefin elastic film composition during the separation process. The sample is in the form of a film having a basis weight of between 5 and 150 g/m$^2$.

Five specimens are provided by fresh products, or cut from the same portion of identical products. The basis weight of each film specimen is measured. If the difference in the elastic film specimen basis weight is more than 10% between highest and lowest basis weight samples, then specimens are re-collected from a different part of the film, or from fresh products. Each film specimen is analyzed by the methods described below. For the Tensile Test and Hysteresis Test, the direction in which specimen has longer dimension is considered the specimen direction of stretching.

1-2. Specimen Weight and Basis Weight

Each specimen is weighed to within ±0.1 milligram using a digital balance. Specimen length and width are measured using digital Vernier calipers or equivalent to within ±0.1 mm. All testing is conducted at 22±2° C. and 50±10% relative humidity. Basis weight is calculated using equation below.

$$\text{Basis Weight} \left(\frac{g}{m^2}\right) = \frac{(\text{Weight of the sample in grams})}{(\text{Length of the sample in meters})}$$
$$(\text{Width of the sample in meter})$$

1-3. Tensile Test Setup

A suitable tensile tester interfaced with a computer such as MTS model Alliance RT/1 with TestWorks 4® software or equivalent is used. The tensile tester is located in a temperature-controlled room at 22° C.±2° C. and 50±10% relative humidity. The instrument is calibrated according to the manufacturer's instructions. The data acquisition rate is set to at least 50 Hertz. The grips used for the test are wider than the sample. Grips having 50.8 mm width may be used. The grips are air actuated grips designed to concentrate the entire gripping force along a single line perpendicular to the direction of testing stress having one flat surface and an opposing face from which protrudes a half round (radius=6 mm, e.g. part number: 56-163-827 from MTS Systems Corp.) or equivalent grips, to minimize slippage of the sample. The load cell is selected so that the forces measured are between 10% and 90% of the capacity of the load cell used. The initial distance between the lines of gripping force (gauge length) is set at 25.4 mm. The load reading on the instrument is zeroed to account for the mass of the fixture and grips.

The specimen is mounted into the grips in a manner such that there is no slack and the load measured is between 0.00 N and 0.02 N. The specimen is mounted in the center of the grips, such that the specimen direction of stretching is parallel to the applied tensile stress.

1-4. Tensile Test

The instrument is set up and the specimen mounted as described in the Tensile Test Setup above. The tensile test is initiated and the specimen is extended at 254 mm/min, with a data acquisition rate of at least 50 Hertz, until the specimen breaks, typically 800-1000% strain. The % Strain is calculated from the length between grip lines L, and initial gauge length, $L_0$, as illustrated in FIG. 1, using the following formula:

$$\% \text{ Strain} = \frac{(L - L_0)}{L_0} \times 100$$

Five specimens of each set are measured, and the arithmetic average of force at peak (N), force at break (N), % Strain at peak, and % Strain at break are recorded. Peak is defined as the higher force value followed by substantial drop. Break is defined as the point where the material fractures or ruptures, and force drops rapidly to zero value. % Strain at peak is defined as the % Strain at the peak force, and % Strain at break is defined as the % strain at the break force.

Forces recorded in Newton (N) by the method are divided by the width of the laminate sample (2.54 cm) tested to normalize the data for laminates, and recorded in Newton (N)/cm.

1-5. Hysteresis Test

The instrument is set up and the specimen mounted as described in the Tensile Test Setup section above. Data acquisition rate is set to at least 50 Hertz.

The Hysteresis Test method for specimens involves the following steps (all strains are strains):

(1) Strain the specimen to 130% strain at a constant crosshead speed of 25.4 cm per minute.
(2) Hold specimen at 130% strain for 30 seconds.
(3) Go to 0% strain at a constant crosshead speed of 25.4 cm per minute.
(4) Hold specimen for 1 minute at 0% strain.
(5) Pull the specimen to 0.127 N force and return to 0% strain with no hold time.

Five specimens of each set are measured, and the arithmetic average is calculated for each of the recorded hysteresis parameters for film and laminates.

The measured and recorded forces, in Newtons (N), are the load force at 75% strain in step (1) and the unload force at 75% strain in step (3). Specimen length at 0.127 N force in step (5) is also recorded and used to calculate the % Set in the material as below.

% Set=((Length at 0.127 N force−Original Gauge length)/Original Gauge length)×100

The unload force at 75% strain, and ratio of load force/unload force at 75% strain are reported for laminates. Forces recorded in Newton (N) by the method are divided by the width of the laminate sample (2.54 cm) tested to normalize the data for laminates, and recorded as N/cm.

For films, the forces are normalized to stress in MPa as follows: Stress=[measured force at given strain, in Newtons]/[Cross-sectional area, in mm2].

Sample cross-sectional area is calculated from sample weight, W (g); before straining sample length, 1 (mm); and density of the material, ρ (g/cm³). Sample cross-sectional area $A_0$ (mm²) is given by formula: $A_0 = [W \times 10^3]/[\rho \times 1]$. A density of 0.862 grams/cm³ is used for all film specimens.

Unload stress at 75% strain is reported in MPa for films.

2. Thermal Analysis Method

Approximately 3 milligrams of film specimen enclosed into a DSC (differential scanning calorimetry) pan. The weight of the specimen is recorded to within ±0.1 mg and used for any calculation performed using the information collected from DSC run.

The thermal properties of the specimen are measured by DSC using a DSC Q2000 V23.10 Build 79 from Perkin Elmer, or equivalent instrument. The specimens are analyzed using standard procedures such as outlined in ASTM D3418-08. This method is capable of determining the temperature ranges over which phase changes occur, e.g., glass transition or crystalline melting. The procedure is modified as follows to carry out two heating cycles.

1: Equilibrate at −90.00° C. for 5 min
2: Ramp up at 20.00° C./min to 200.00° C.
3: Isothermal for 5.00 min
4: Ramp down at 20.00° C./min to −90.00° C.
5: Isothermal for 5.00 min
6: Ramp up at 20.00° C./min to 200.00° C.

The heat flow data collected are used for analyzing crystallinity of the material. The first heat curve (step 2 above) data are used for the calculation of heat of fusion using the method described below.

Figure 2A:
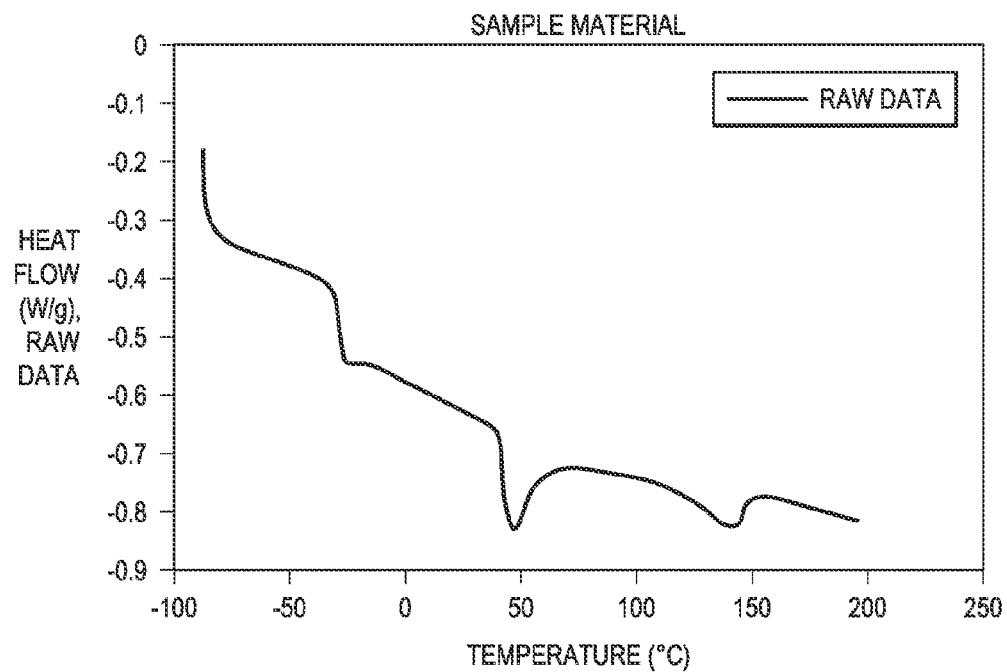
FIG. 2 (a)-(d) are systematic representations of the data correction method for the Thermal Analysis Method defined herein.
Figure 2B:
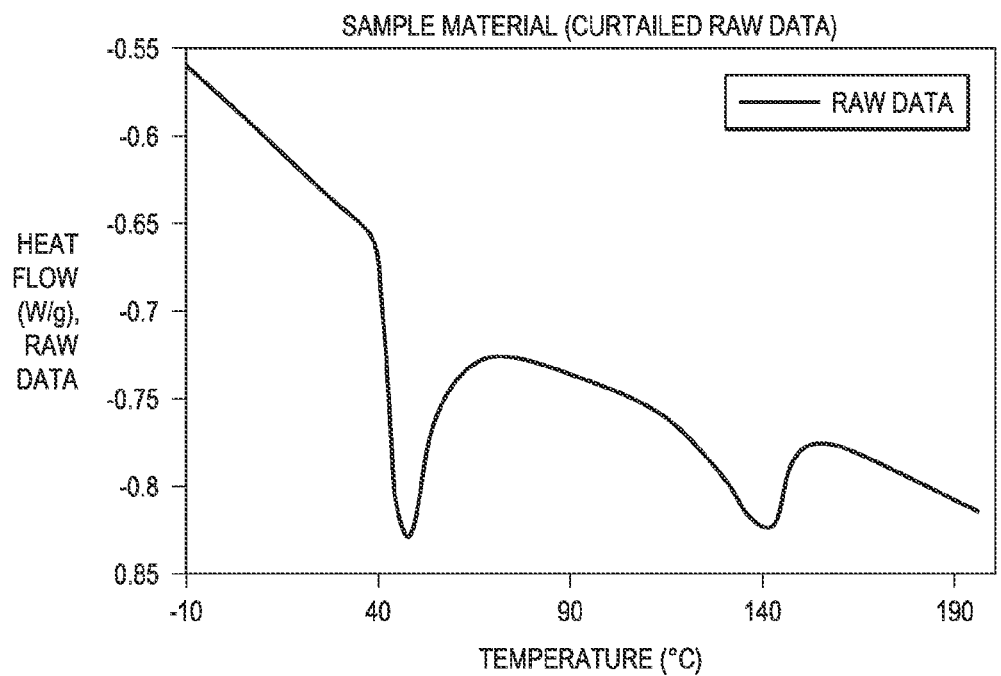

In order to determine accurate heat flow, a mathematical baseline subtraction is performed using $3^{rd}$ order polynomial baseline fit. First the raw data from DSC, heat flow in W/g versus temperature (° C.), is obtained in Microsoft Excel format. The data are then curtailed to a useful temperature range of −10° C. to 200° C., and Heat Flow (W/g) is plotted as a function of Temperature (See FIGS. 2a and 2b).

Figure 2C:
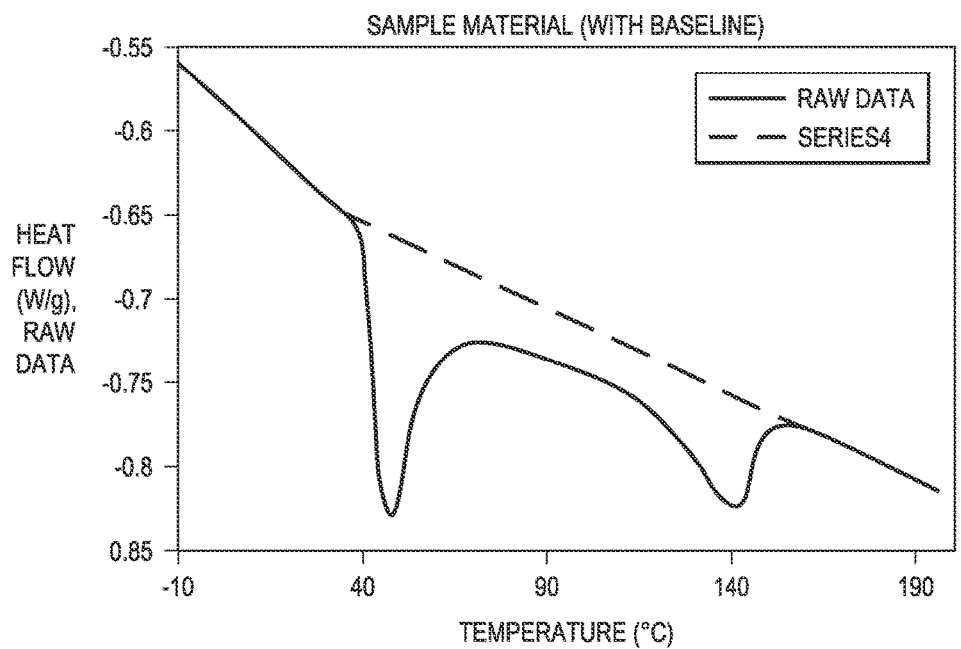
Figure 2D:
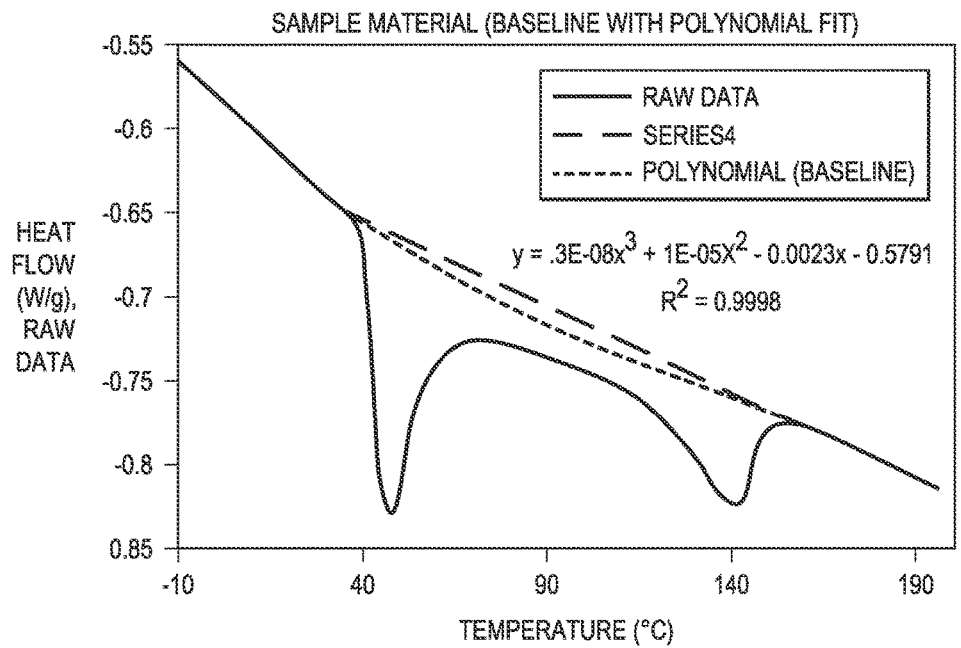

A single $3^{rd}$ order Polynomial curve is fitted to the data from −10° C. to +35° C., and from 165° C. to 200° C. using Microsoft Excel Trendline tool (See FIGS. 2c and 2d). The polynomial curve drawn is selected as the baseline for correction.

Figure 3A:
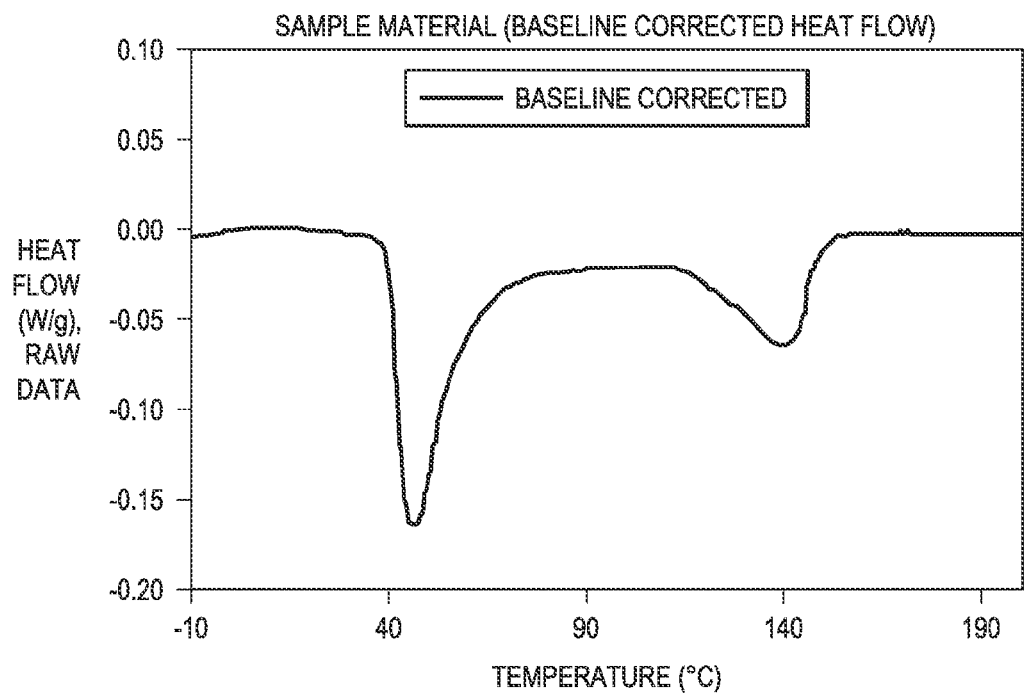
FIG. 3 (a)-(b) describe an embodiment of the base line corrected DSC chart according to the Thermal Analysis Method defined herein of a polyolefin elastic film composition of the present invention.
Figure 3B:
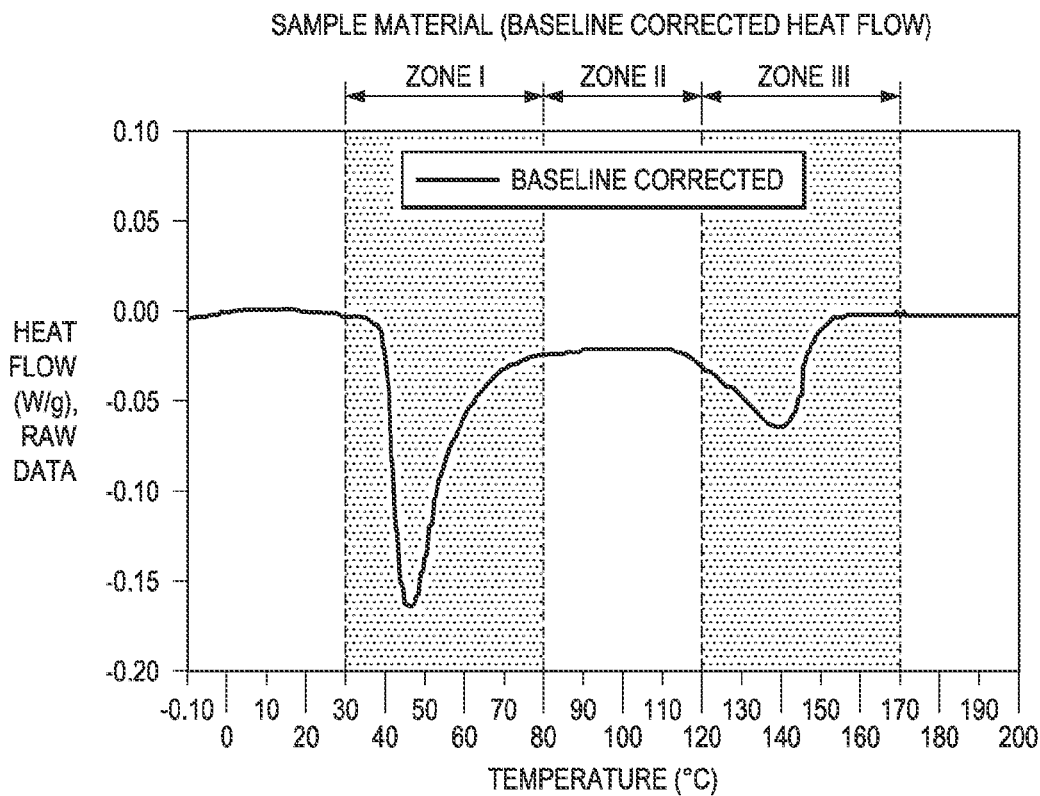
Figure 4A:
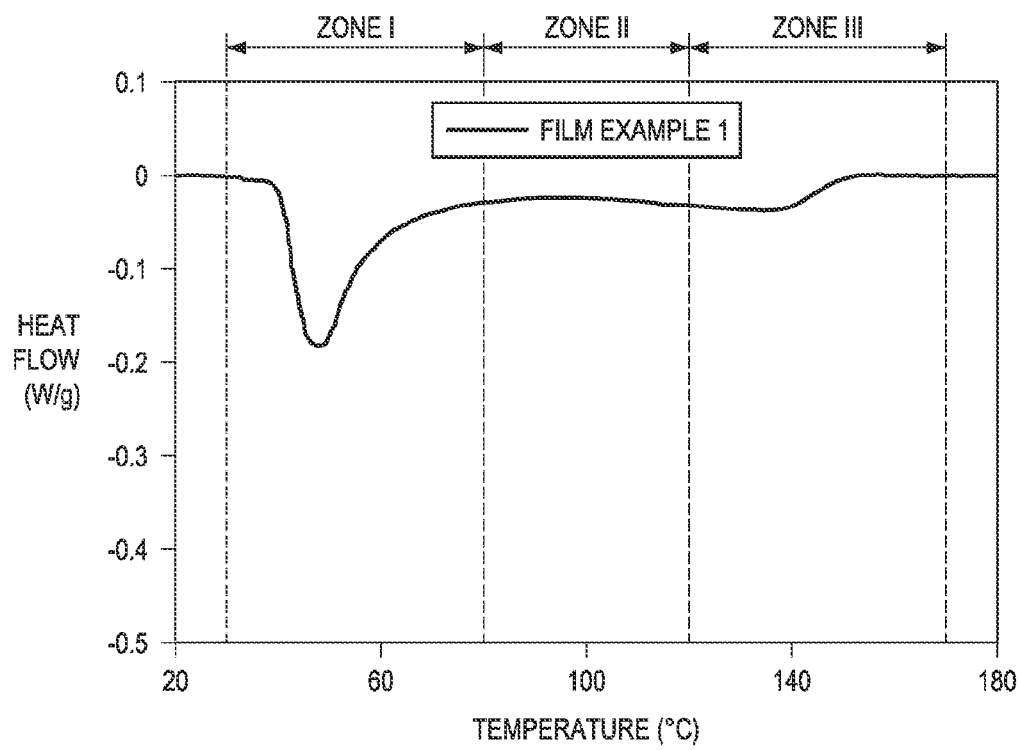
FIG. 4 (a)-(d) are the base line corrected DSC charts according to the Thermal Analysis Method defined herein of Film Examples 1-3 and Comparative Film Example 1, respectively.
Figure 4B:
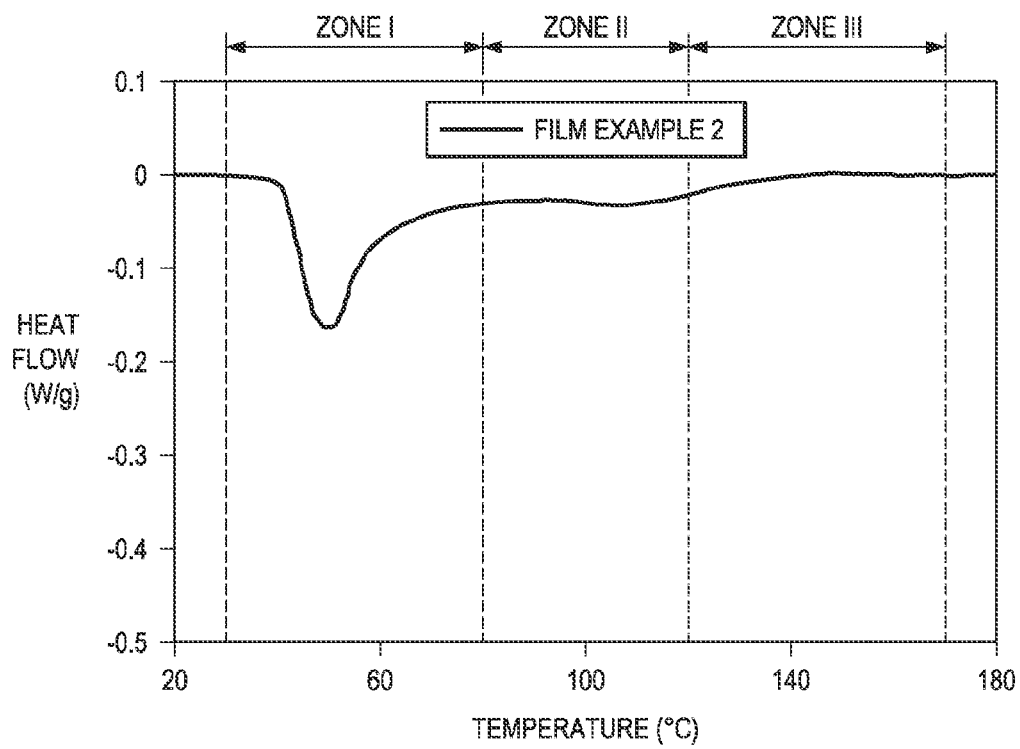
Figure 4C:
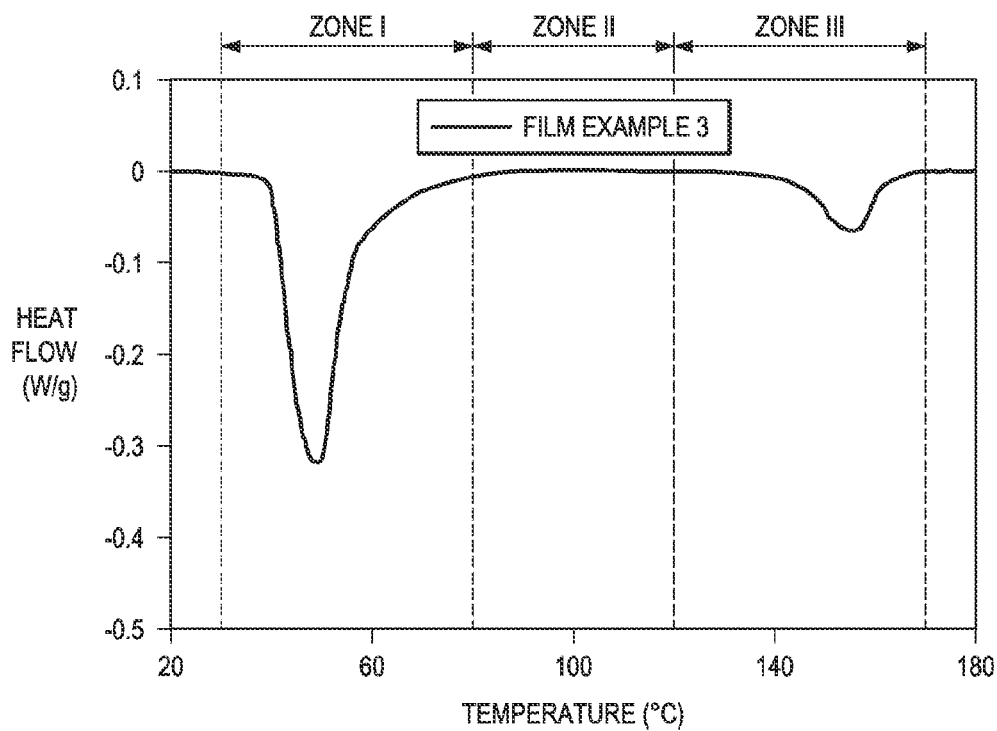
Figure 4D:
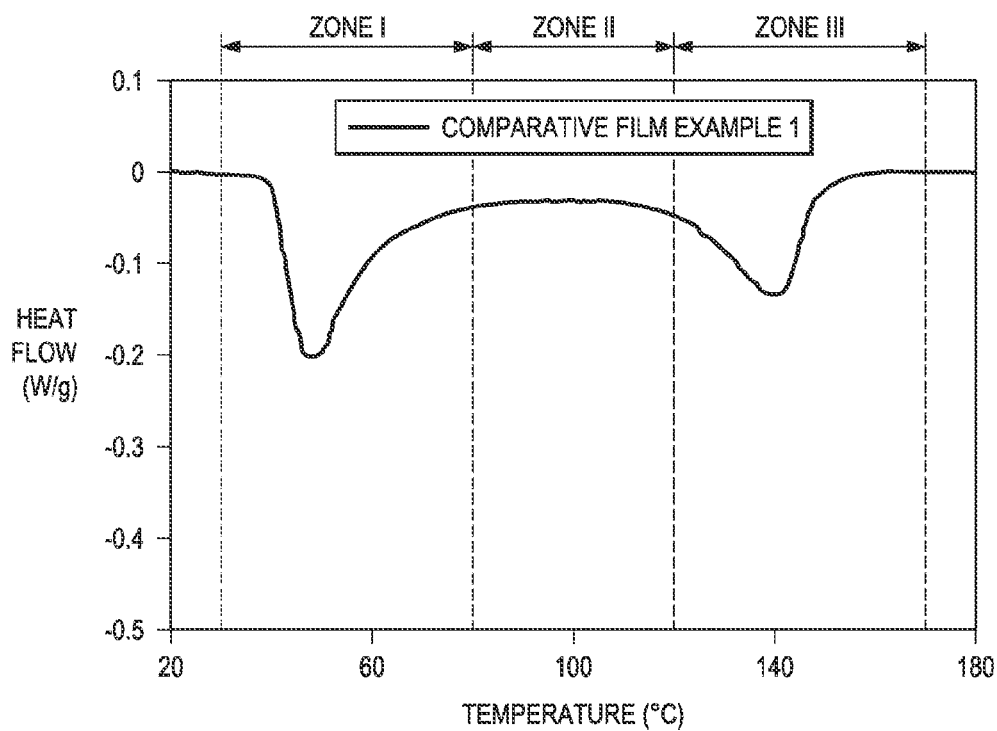

To obtain accurate heat of fusion (enthalpy) data, the polynomial baseline is subtracted from the heat flow curve between −10° C. and 200° C. This is done by calculating the appropriate heat flow baseline value at each data point and subtracting this value from the original heat flow value measured. This shifts the heat flow curve towards zero heat flux line (See FIG. 3a). Once the baseline corrected heat flow data are generated, the plot is divided into three zones (See FIG. 3b): Zone I (30-80° C.), Zone II (80-120° C.), and Zone III (120-170° C.).

The area under corrected heat flow curve is integrated with respect to time to determine the enthalpies in J/g for each of the three temperature zones. The sum of the integrated enthalpy values from Zones I and III, and the ratio of the integrated enthalpy value of Zone I to the value for Zone III are calculated. Two specimens are run and the average integrated enthalpy for each zone is calculated. Average value for each zone is used to calculate and report average integrated enthalpy sum and average integrated enthalpy ratio.

Along with crystalline enthalpy, crystalline melting temperature of a polymer is measured using DSC method described above. Crystalline melting point is defined as in the DSC method ASTM D3418-08, which refers to it as $T_{pm}$.

3. Air Permeability Test

The air permeability of a substrate (e.g., film, laminate, or article component) is determined by measuring the flow rate of standard conditioned air through a test specimen driven by a specified pressure drop. This test is particularly suited to materials having relatively high permeability to gases, such as nonwovens, apertured films and the like. ASTM D737 is used, modified as follows.

A TexTest FX 3300 instrument or equivalent is used, available from Textest AG, Switzerland, or from Advanced Testing Instruments ATI in Spartanburg S.C., USA. The procedures described in the Operating Instructions for the TEXTEST FX 3300 Air Permeability Tester manual for the Air Tightness Test and the Function and Calibration Check are followed. If a different instrument is used, similar provisions for air tightness and calibration are made according to the manufacturer's instructions.

The test pressure drop is set to 125 Pascal and the 5 cm$^2$ area test head (model FX 3300-5) or equivalent is used. The result is recorded to three significant digits. The average of 5 specimens is calculated and reported as the Air Permeability Value (m$^3$/m$^2$/min).

EXAMPLES

Polyolefin elastomers coded A, B, D, E, and G were used at indicated weight percentages of Table 1 for providing polyolefin elastic film layers coded Film Examples 1-3 and Comparative Film Example 1. Film Example 1 was further formed into film layers of 25 gsm and 40 gsm by the methods below. These films were each formed into a trilaminate using the same two nonwoven layers by the methods below, and coded Laminate Example 1 (40 gsm) and Laminate Example 2 (25 gsm). Film Examples 1-3 and Comparative Film Example 1 were subjected to Tests 1-3 as follows, and reported in Table 1 below. Laminate Examples 1 and 2 were subjected to Tests 4-8 as follows, and reported in Table 3 below.

Test 1: Average integrated enthalpy sum (J/gm) according to the Thermal Analysis Method defined herein, DSC charts for Film Examples 1-3 and Comparative Film Example 1 shown as FIGS. 4(a)-(d) for the polyolefin elastic film.

Test 2: Average integrated enthalpy ratio according to the Thermal Analysis Method defined herein for the polyolefin elastic film.

Test 3: Unload stress at 75% strain above 0.8 MPa according to the Hysteresis Test defined herein for the polyolefin elastic film.

Test 4: Normalized load force/normalized unload force ratio at 75% strain of 1 to 2.6 according to the Hysteresis Test defined herein for the laminate.

Test 5: Normalized unload force at 75% strain for the laminate according to the Hysteresis Test defined herein, Hysteresis charts for Laminate Examples 1 and 2 shown as FIG. 5.

Test 6: Normalized force at break for the laminate according to the Tensile Test defined herein, Tensile charts for Laminate Examples 1 and 2 shown as FIG. 6.

Figure 6:
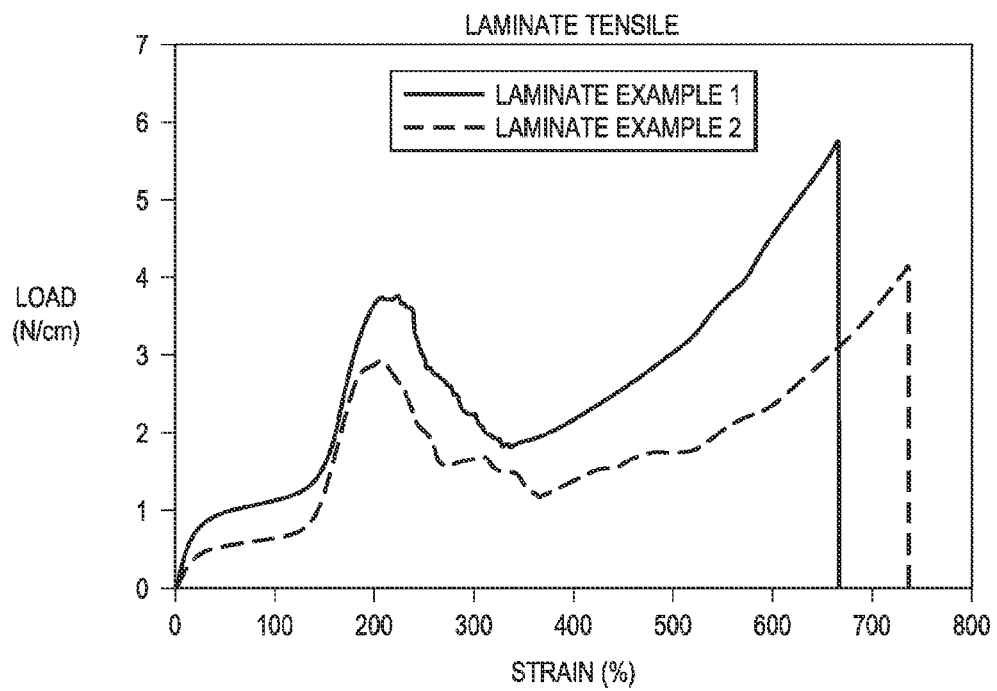
FIG. 6 shows the Tensile Test charts of the Laminate Example 1 and Laminate Example 2.

Test 7: % Strain at break for the laminate according to the Tensile Test defined herein, Tensile charts for Laminate Examples 1 and 2 shown as FIG. 6.

Test 8: Peak strain for the laminate according to the Tensile Test defined herein, Tensile charts for Laminate Examples 1 and 2 shown as FIG. 6.

A: Vistamaxx 6102 (available from ExxonMobil, Houston, Tex.): blend of two random propylene-ethylene copolymers exhibiting a single sharp glass transition temperature (Tg) of about −32° C. and an overall crystallinity of about 6 wt %. The crystalline phase exhibits two melting peaks at about 50° C. and about 110° C.

B: NOTIO PN-0040 (available from Mitsui Chemicals, Tokyo Japan): elastic polyolefin resin with glass transition temperature of about −30° C. exhibiting two melting peaks at about 45° C. and about 157° C.

D: Versify 2400A (available from Dow Chemical, Midland, Mich.): random copolymers of propylene with ethylene with glass transition temperature of about −40° C. with crystalline phase having two melting peaks at about 50° C. and about 140° C.

E: Versify 2400B (available from Dow Chemical, Midland, Mich.): random copolymers of propylene with ethylene with glass transition temperature of about −40° C. with crystalline phase having two melting peaks at about 50° C. and about 140° C.

G: Versify 3401B (available from Dow Chemical, Midland, Mich.): random copolymers of propylene with ethylene with glass transition temperature of about −40° C. with crystalline phase having two melting peaks at about 50° C. and about 140° C.

An Extruder manufactured by Berstorff (a division of KraussMaffei Corporation, Florence, Ky.) under the name ZE25 is used to create sample films of A, B, D, E, G, Film Examples 1-3 and Comparative Film Example 1. This extruder has 25 millimeter screw diameters, a length-to-diameter ratio of 32, and six heating/cooling barrel zones along its length in addition to a cooled feeding zone. A dry blend of the polyolefin elastomers and any other materials, if required, are tumbled to achieve a relatively uniform mixture, and the dry blend is fed to the extruder via a vibratory gravity feeder. The first heating/cooling zone (barrel zone 2) is maintained at a sufficiently high temperature to initiate softening of the polyolefin elastomers, and consists of conveying elements for transporting the materials forward. The second through fourth heating/cooling zones (barrel zones 3-5) are each equipped with a high shearing forward kneading element and forward conveying elements, while the fourth heating/cooling zone (barrel zone 5) is also equipped with a high shearing backward kneading element and the fifth heating/cooling zone (barrel zone 6) is equipped with a dispersion element and a reverse conveying seal element, all to facilitate increased pressure, shearing, and mixing of the low and high molecular weight components. The sixth and last heating/cooling zone (barrel zone 7) is equipped with forward conveying elements intended to build sufficient pressure behind a cast film die, and to facilitate extrusion through the die. For Film Example 1 and Comparative Film Example 1 in Table 1, the set temperature profile (barrel zones 2-7, transfer tube, die) is about 193° C., 204° C., 216° C., 232° C., 238° C., 249° C., with the screws being rotated at about 50 revolutions per minute. The extrusion die temperature after zone 7 is set at 249° C. A 25.4 cm wide coat hanger cast film die is used to shape the material into a thin film, and a film take-off unit is positioned to receive the extrudate which is collected on double sided silicone coated release paper and wound onto a cardboard roll. An air knife (Curtain Transvector® Air knife Model 921-12) at 275 kPa and at room temperature was used in between the die and take-off roll to cool down the material and to help with web handling/winding. The film basis weight is adjusted by varying the linear speed of the take-off unit. For generating data herein, a mono-layer film of the material is collected from the 254 mm cast film die, and the middle 127 mm is used. The film is stored at room temperature (22±2° C.) and allowed to crystallize for 3 to 6 weeks at room temperature to reach equilibrium.

Pre-Straining and aging is conducted as follows: The extruded film is pre-strained in cross machine direction to simulate the activation process used in the production of elastic members useful for absorbent articles. The film is pre-strained to 300% strain using tensile tester at 0.166 s$^{-1}$ strain rate and immediately returned to zero strain at 0.166 s$^{-1}$. The ratio of initial gauge length to width of the sample is set to 1. The pre-strained film is then removed from the tensile tester and laid flat on a smooth surface. It is aged at 22±2° C. for 3-6 weeks to reach equilibrium. The film is analyzed by the Thermal Analysis Method and the Hysteresis Test as detailed above.

TABLE 1

|  | Polyolefin elastic film composition (wt %) | Test 1 (J/gm) | Test 2 | Test 3 (MPa) |
|---|---|---|---|---|
| A |  | 8.97 | >1000 | 1.0 |
| B |  | 24.45 | 3.49 | 0.87 |
| D |  | 11.00 | 8.85 | 0.77 |
| E |  |  |  | 1.44 |
| G |  |  |  | 1.00 |
| Film Example 1 | 40% A, 36% E, 24% G | 13.07 | 3.64 | 1.28 |
| Film Example 2 | 40% A, 60% D | 9.69 | 13.36 | 0.97 |
| Film Example 3 | 40% A, 60% B | 15.28 | 4.89 | 1.03 |
| Comparative Film Example 1 | 60% E, 40% G | 19.44 | 1.49 | 1.31 |

Laminate Examples 1 and 2 are made as such: Film Example 1 of 40 gsm is used for Laminate Example 1, and Film Example 1 of 25 gsm is used for Laminate Example 2. Laminate Examples 1 and 2 are tri-laminates having both sides of the polyolefin elastic film layer sandwiched with nonwoven layers. Before preparing the tri-laminate, a first nonwoven/adhesive laminate is prepared. A 22 gsm SSS (Spun-Spun-Spun) 70/30 PP/PE bico nonwoven material available from Pegas, Czech republic cut to 150 mm in CD and 150 mm in MD size. Adhesive H2031 available from Bostik, USA is applied at 12 gsm basis weight on the silicone release paper sheet to create 1 mm on, 2 mm off bead pattern with bead running in MD. This can be accomplished using various adhesive spray techniques known to ordinary skilled in art. Adhesive is later transferred from the pre-prepared release sheet onto nonwoven in a way that MD running beads align with MD of nonwoven. Before removing release paper, bonded adhesive sheet is rolled with a 4.5 pound (2 kg) HR-100 ASTM 80 shore rubber-faced roller. Two full strokes (i.e., back and forth) in MD are applied to the sample at a speed of approximately 10 mm/sec, across the entire width of the sample. Release paper is carefully removed afterward and it is made sure that adhesive transferred to nonwoven. The first nonwoven/adhesive laminate prepared such way is then used to bond with elastic film.

Elastic film to be laminated is extruded and allowed to crystallize for 3-6 weeks as described before, then cut to 150 mm in CD and 150 mm in MD. The open surface of the cut film with silicone release paper attached to the other surface is laid over the open adhesive surface of the selected nonwoven/adhesive laminate. MD of the film is aligned with the MD of the nonwoven/adhesive laminate. When laying film over the adhesive, care must be taken to avoid any wrinkles in the film. If film is wrinkled, sample is discarded. Once, film is laid on top of the open adhesive surface, the laminate with film is rolled using HR-100 roller the same way as before for two full strokes to ensure solid bonding. Care is taken to avoid film contamination while using roller. Once the first nonwoven/adhesive/elastic film sandwich laminate is prepared, silicone release paper is removed from the film. The new open surface of the film is then combined with the second nonwoven/adhesive laminate.

The second nonwoven selected for tri-laminate making is 22 gsm SSMMS (Spun-Spun-Meltblown-Meltblown-Spun) 70/30 PP/PE bicomponent nonwoven available from Pegas, Czech Republic. Nonwoven/Adhesive laminate with the second nonwoven prepared using the same method and adhesive as used to prepare the first nonwoven/adhesive laminate. Once the second nonwoven/adhesive laminate is prepared, it is combined with the opposite side of the film of the first nonwoven/adhesive/elastic film sandwich laminate. The combined laminate is then rolled using HR-100 roller the same way as before for two full strokes to ensure solid bonding across entire width. Thus prepared tri-laminate (nonwoven/elastic film/nonwoven) is later cut to 80 mm MD and 100 mm CD size for HSRP activation.

The sample laminates above are activated using HSRP with activation plates having inter-meshing teeth with a tip radius of 0.1 mm, a root radius of 0.737 mm and tooth height of 25.4 mm. The activation results in the laminate having an increased level of stretch compared to the non-activated laminate. Additional details of activation with the HSRP are shown in Table 2 below (activation direction, depth of engagement, maximum average % engineering strain of activation, and target maximum activation strain rate). Web Speed (m/sec) and Roll Diameter (mm) in Table 2 are corresponding ring-roll process related variables. One can use ring roll process with two rolls made with inter-meshing teeth design described above to activate laminate. HSRP test set-up described in the Table 2 mimics continuous process where web is activated between two rolls, each roll has 152.4 mm diameter, running at 2.278 m/sec web speed with depth of engagement of roll teeth fixed at 6.5 mm engagement.

TABLE 2

| Strain Direction | Depth Of Engagement (mm) | Web Speed (m/sec) | Roll Diameter (mm) | Max Avg Strain (%) | Max Avg Peak Strain Rate (sec-1) |
|---|---|---|---|---|---|
| CD | 6.5 | 2.278 | 152.4 | 259 | 442 |

Activated laminate examples comprising polyolefin resins in the film composition are allowed to age a minimum of 7 days at 23±2° C. before testing the physical properties.

The laminate samples are analyzed by the Tensile Test and the Hysteresis Test as detailed above. The Hysteresis and Tensile charts of these tests are provided in FIGS. 5 and 6, respectively. Laminate Examples 1 and 2 exhibit two peaks according to the Tensile Test. Results of Tests 4-8 are found in Table 3 below.

TABLE 3

|  | Test 4 | Test 5 (N/cm) | Test 6 (N/cm) | Test 7 (%) | Test 8 (%) |
|---|---|---|---|---|---|
| Laminate Example 1 | 2.19 | 0.5 | 5.94 | 671 | 223 |
| Laminate Example 2 | 2.32 | 0.29 | 3.41 | 735 | 205 |

Film Examples 2 and 3, when formed into tri-laminates in a similar manner as Laminate Examples 1 and 2, exhibit properties as defined for laminates of the present invention according to the Hysteresis test and Tensile test herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A trilaminate comprising one polyolefin elastic film layer and two substrate layers;
   the polyolefin elastic film having the following properties:
   (1) an average integrated enthalpy sum of no greater than 17 J/g, according to the Thermal Analysis Method defined herein;
   (2) an average integrated enthalpy ratio of from 0.6 to 300, according to the Thermal Analysis Method defined herein; and
   (3) an unload stress at 75% strain of above 0.8 MPa according to the Hysteresis Test defined herein; and
   wherein the trilaminate has a normalized load force/normalized unload force ratio at 75% strain of 1 to 2.6 according to the Hysteresis Test defined herein;
   wherein the polyolefin elastic film layer comprises a first polyolefin elastomer, a second polyolefin elastomer, and a third polyolefin elastomer;
   wherein the first polyolefin elastomer comprises a blend of two random propylene-ethylene copolymers and has an overall crystallinity of about 6 wt %;
   wherein the second polyolefin elastomer comprises random copolymers of propylene with ethylene and has a glass transition temperature of about −40° C.;
   wherein the third polyolefin elastomer comprises random copolymers of propylene with ethylene and has a glass transition temperature of about −40° C.;
   wherein the second polyolefin elastomer is different than the third polyolefin elastomer; and
   wherein the two substrate layers are two nonwoven layers.

2. The trilaminate of claim 1 having a normalized unload force at 75% strain of above 0.25 N/cm according to the Hysteresis Test defined herein.

3. The trilaminate of claim 1 having a normalized force at break of at least 3.4 N/cm according to the Tensile Test defined herein.

4. The trilaminate of claim 1 having a % strain at break of at least 500% according to the Tensile Test defined herein.

5. The trilaminate of claim 1 which exhibits two peaks according to the Tensile Test defined herein.

6. The trilaminate of claim 1 which exhibits a peak at lower than 300% strain according to the Tensile Test defined herein.

7. The trilaminate of claim 1 wherein the two nonwoven layers are extensible.

8. The trilaminate of claim 1 wherein the two nonwoven layers are made of bicomponent fibers.

9. The trilaminate of claim 1 wherein the polyolefin elastic film layer has a basis weight of from about 5 to about 150 g/m$^2$.

10. The trilaminate of claim 1 wherein the trilaminate is incrementally stretched.

11. A component for an absorbent article made of the trilaminate of claim 1, said component selected from the group consisting of waistbands, leg elastic, side panels, elastic belts, stretch outer cover, and stretch ears.

12. The trilaminate of claim 1 wherein the polyolefin elastic film's average integrated enthalpy sum is between about 5-17 J/g.

* * * * *